US010416326B2

(12) United States Patent
Kostov et al.

(10) Patent No.: US 10,416,326 B2
(45) Date of Patent: Sep. 17, 2019

(54) METHOD FOR PREDICTING MULTIPLES IN SURVEY DATA

(71) Applicant: SCHLUMBERGER TECHNOLOGY CORPORATION, Sugar Land, TX (US)

(72) Inventors: Clement Kostov, Houston, TX (US); Scott A. Slaton, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 469 days.

(21) Appl. No.: 14/975,076

(22) Filed: Dec. 18, 2015

(65) Prior Publication Data

US 2017/0176612 A1 Jun. 22, 2017

(51) Int. Cl.
G01V 1/28 (2006.01)
G01V 1/38 (2006.01)
(Continued)

(52) U.S. Cl.
CPC ............ *G01V 1/282* (2013.01); *G01V 1/301* (2013.01); *G01V 1/303* (2013.01); *G01V 1/36* (2013.01); *G01V 1/3808* (2013.01); G01V 2210/1293 (2013.01); G01V 2210/1423 (2013.01); G01V 2210/56 (2013.01); G01V 2210/67 (2013.01)

(58) Field of Classification Search
CPC .......... G01V 1/282; G01V 1/36; G01V 1/301; G01V 1/303; G01V 1/3808; G01V 2210/56; G01V 2210/1423; G01V 2210/1293; G01V 2210/67

See application file for complete search history.

(56) References Cited

U.S. PATENT DOCUMENTS 6,735,527 B1 * 5/2004 Levin ................. G01V 1/36
702/14
7,181,347 B2 * 2/2007 Moore ................ G01V 1/38
367/24

(Continued)

OTHER PUBLICATIONS

"Petroleum and Gas Reserves Exploration by Real-Time Expert Seismology and Non-Linear Seismic Wave Motion," Advances in Petroleum Exploration and Development, vol. 4, No. 1, pp. 1-12, 2012.*

(Continued)

Primary Examiner — Khaja Ahmad
(74) Attorney, Agent, or Firm — Michael Guthrie

(57) ABSTRACT

A method includes receiving a seismic dataset from a survey, wherein the seismic dataset represents a portion of a subsurface geological formation and includes primary and multiple data. The method further includes the steps of conditioning the seismic dataset and estimating a model of the multiple data in the conditioned seismic dataset based on a user-defined parameter to derive a primary data set. Further, the method includes the steps of computing a velocity model from the primary data set using the user-defined parameter and updating the estimated multiple model based at least on a modification of the user-defined parameter. In addition, the method includes the steps of recomputing the primary data and the velocity model based on the modified user-defined parameter and generating an image of the primary data.

19 Claims, 5 Drawing Sheets

(51) Int. Cl.
*G01V 1/30* (2006.01)
*G01V 1/36* (2006.01)

(56) References Cited

U.S. PATENT DOCUMENTS

| | | | |
|---|---|---|---|
| 7,453,765 B2 | 11/2008 | Ikelle | |
| 7,796,467 B2* | 9/2010 | Bisley | G01V 1/28 367/24 |
| 2006/0056272 A1* | 3/2006 | Hill | G01V 1/282 367/73 |
| 2007/0032954 A1 | 2/2007 | Moore et al. | |
| 2008/0043573 A1 | 2/2008 | Bisley et al. | |
| 2012/0095689 A1 | 4/2012 | Kostov et al. | |
| 2012/0163121 A1 | 6/2012 | Hardage | |
| 2013/0131988 A1 | 5/2013 | Vermeer et al. | |
| 2014/0200815 A1 | 7/2014 | Hung et al. | |
| 2014/0324358 A1* | 10/2014 | Kitchenside | G01V 1/28 702/17 |
| 2015/0006085 A1 | 1/2015 | Bisley et al. | |
| 2016/0047925 A1* | 2/2016 | Lou | G01V 1/303 702/18 |
| 2016/0238722 A1* | 8/2016 | Vdovina | G01V 1/282 |
| 2017/0023688 A1* | 1/2017 | Schneider, Jr. | G01V 1/306 |

OTHER PUBLICATIONS

Ke Benzi, Li Peng, Fang Yunfeng, Huang Zhi—An approach to optimize the multiple contribution gather aperture, SEG Technical Program Expanded Abstracts 2012: 1-5.
Bill Dragoset, Eric Verschuur, Ian Moore, Richard Bisley—A perspective on 3D surface-related multiple elimination, Geophysics, Sep. 2010, vol. 75, No. 5, pp. 75A245-75A261, online publication date: Sep.-Oct. 2010.
Moore and Dragoset, 2008, General Surface multiple prediction: a flexible 3D SRME algorithm; First Break, (12 pages).
Zhiming James Wu, Bill Dragoset—Robust internal multiple prediction algorithm—SEG Technical Program expanded abstracts 2011: 3541-3545.
Press et al., 1992. Numerical recipes in C++; the art of scientific computing; Cambridge University press, second edition, pp. 141-142.
Dragoset, et al. "A perspective on 3D surface-related multiple elimination," Geophysics, Sep.-Oct. 2010, vol. 75, No. 5, pp. 75A245-75A261.
International Search Report and Written Opinion for the equivalent International patent application PCT/US2016/065222 dated Mar. 17, 2017.
Extended Search Report issued in the related EP Application 16876401.7, dated Jun. 26, 2019 (8 pages).

* cited by examiner

METHOD FOR PREDICTING MULTIPLES IN SURVEY DATA

BACKGROUND

Seismic surveying is a method for determining the structure of subterranean formations in the earth. Seismic surveying can utilize seismic energy sources that generate seismic waves, and seismic receivers that are positioned to detect the seismic waves. The seismic waves propagate into the formations in the earth, where a portion of the waves reflects from interfaces between subterranean formations. The reflected seismic waves are detected by the seismic receivers, which convert the reflected waves into representative seismic datasets. The datasets can be transmitted by electrical, optical, radio or other techniques to devices which record the datasets. Through analysis of the recorded datasets, the shape, position and composition of subterranean formations can be determined.

Land seismic surveying is a method for determining the structure of subterranean formations beneath the surface of the earth. Seismic sources and seismic receivers for land seismic surveying can be placed on the surface of the earth. In different examples, the seismic source(s) or seismic receiver(s), or both, may be placed in a borehole for vertical seismic profiling.

Marine seismic surveying is a method for determining the structure of subterranean formations underlying bodies of water. Marine seismic surveying can utilize seismic energy sources and seismic receivers located in the water and can be towed behind a vessel or positioned on the water bottom from a vessel. Marine seismic surveying can also employ seismic receivers deployed on a seabed cable. The energy source is typically an explosive device or compressed air system which generates seismic energy, which then propagates as seismic waves through the body of water and into the earth formations below seabed. As the seismic waves strike interfaces between subterranean formations, a portion of the seismic waves reflects back through the earth and water to the seismic receivers, to be detected, transmitted, and recorded. The seismic receivers typically used in marine seismic surveying are pressure sensors, such as hydrophones. Additionally, though, motion sensors, such as accelerometers may be used. Both the sources and receivers may be strategically repositioned to cover the survey area.

Seismic waves, however, reflect from interfaces other than just those between subterranean formations, as would be desired. Seismic waves also reflect from the water bottom and the water surface, and the resulting reflected waves themselves continue to reflect. Waves which reflect multiple times are called "multiples". Waves which reflect multiple times in the water layer between the water surface above and the water bottom below are called "water-bottom multiples". Water-bottom multiples have long been recognized as a problem in marine seismic processing and interpretation, so multiple attenuation methods based on the wave equation have been developed to handle water-bottom multiples.

In marine seismic surveying, seismic waves do not reflect just from the interfaces between subterranean formations. Seismic waves also reflect from the water bottom (e.g., seafloor) and the water surface (e.g., sea surface), and the resulting reflected waves themselves continue to reflect. Waves that reflect multiple times are called "multiples." The presence of multiples data in recorded seismic data can adversely affect the accuracy of assumptions made during seismic processing and resulting interpretations made using interpretation techniques.

SUMMARY

In some embodiments, a method includes receiving a seismic dataset from a survey, wherein the seismic dataset represents a portion of a subsurface geological formation and includes primary and multiple data. The method further includes the steps of conditioning the seismic dataset and estimating a model of the multiple data in the conditioned seismic dataset based on a user-defined parameter to derive a primary data set. Further, the method includes the steps of computing a velocity model from the primary data set using the user-defined parameter and updating the estimated multiple model based at least on a modification of the user-defined parameter. In addition, the method includes the steps of recomputing the primary data and the velocity model based on the modified user-defined parameter and generating an image of the primary data.

Other or additional features will become apparent from the following description, from the drawings, or from the claims.

BRIEF DESCRIPTION OF THE DRAWINGS

Some implementations are described with respect to the following figures.

DETAILED DESCRIPTION

Reference will now be made in detail to embodiments, examples of which are illustrated in the accompanying drawings and figures. In the following detailed description, numerous specific details are set forth in order to provide a thorough understanding of some embodiments. However, it will be apparent to one of ordinary skill in the art that the embodiments may be practiced without these specific details.

The terminology used in the description is for the purpose of describing example embodiments. As used in the description and the appended claims, the singular forms "a," "an" and "the" are intended to include the plural forms as well, unless the context clearly indicates otherwise. It will be further understood that the terms "includes," "including," "comprises" and/or "comprising," when used in this application, specify the presence of stated features, integers, tasks, operations, elements, and/or components, but do not preclude the presence or addition of one or more other features, integers, tasks, operations, elements, components, and/or groups thereof.

Although reference is made to subterranean structures or formations in the disclosure, it is contemplated that techniques or mechanisms according to some implementations can be applied to other types of target structures where data imaging and processing issues may occur, such as human tissue, mechanical structures, plant tissue, animal tissue, solid volumes, substantially solid volumes, volumes of liquid, volumes of gas, volumes of plasma, and volumes of space near and/or outside the atmosphere of a planet, asteroid, comet, moon, or other body, and so forth.

Figure 1:
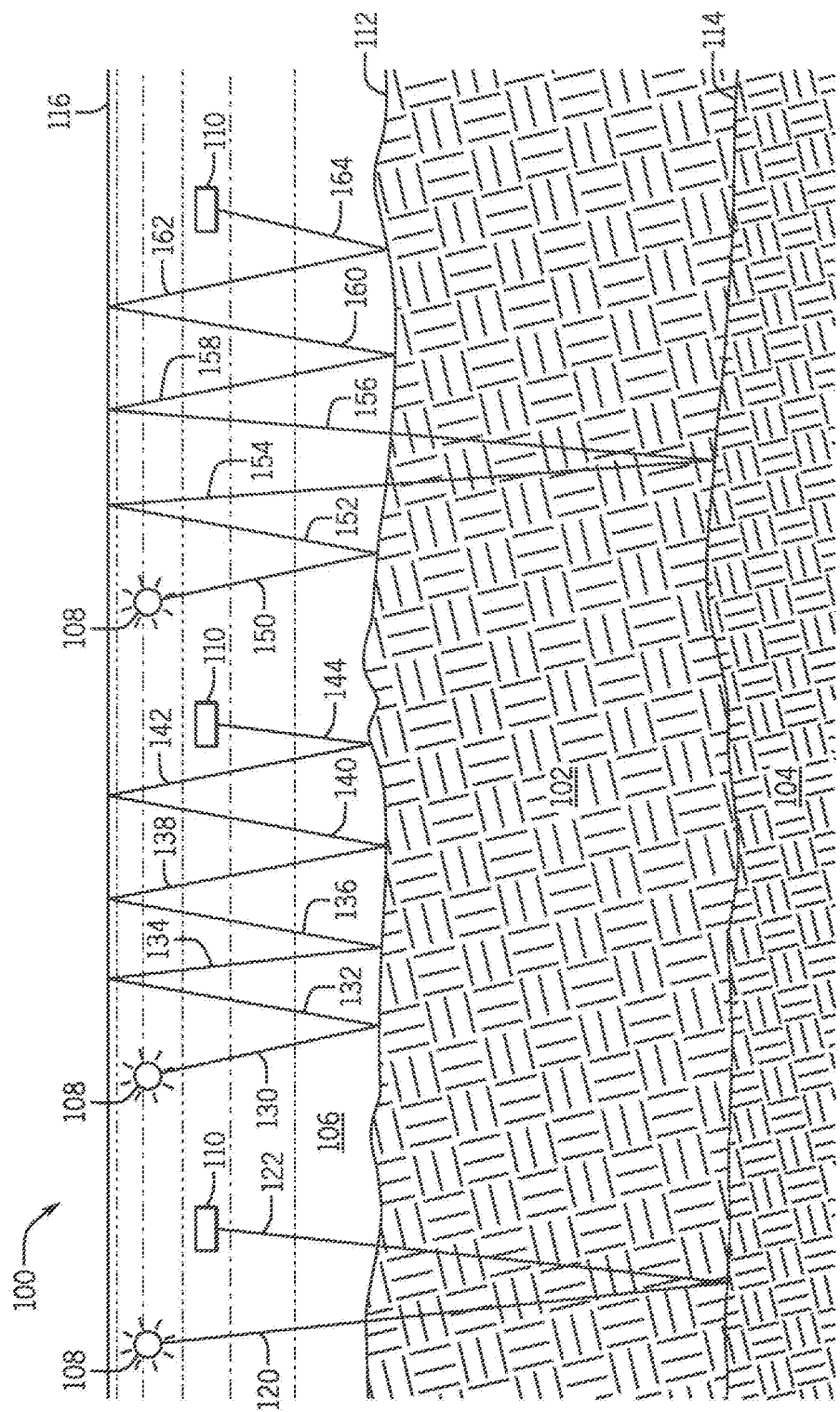
FIG. 1 is a diagrammatic view of an example survey arrangement.

FIG. 1 shows a schematic view of marine seismic surveying example 100. Subterranean formations to be explored, such as 102 and 104, lie below a body of water 106. Seismic energy sources 108 and seismic receivers 110 are positioned in the body of water 106, by one or more marine vessels (not shown). In other examples, seismic receivers can be deployed on a seabed cable. A seismic source 108, such as an air gun, vibrator, or other type of source, creates seismic waves in the body of water 106 and a portion of the seismic waves travels downward through the body of water 106 toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formations, such as an interface 114 between formations 102 and 104. When the reflected waves traveling upward reach the water/air interface at the water surface 116, a majority portion of the waves reflects downward. Continuing in this fashion, seismic waves can reflect multiple times between the water bottom 112 or formation interfaces below and the water surface 116 above. Each time the reflected waves propagate past the position of a seismic receiver 110, the receiver 110 senses the reflected waves and generates representative signals.

In other examples, the sources 108 can be referred to as survey sources that produce energy for propagation into a target structure, and the receivers 110 are referred to as survey receivers to measure signals representing the propagated energy affected by the target structure. In the ensuing discussion, reference is made to seismic data collected by seismic receivers. More generally, survey receivers can acquire survey data, which can include seismic wavefields, acoustic signals, or other signals.

Primary reflections are those seismic waves that have reflected just once, from the water bottom 112 or an interface between subterranean formations, before being detected by a seismic receiver 110. Primary reflections contain the desired information about the subterranean formations which marine seismic surveying seeks. An example of a primary reflection is shown in FIG. 1 by ray paths 120 and 122. Seismic waves are generated by a seismic source 108 and a portion of the waves travels downward through the body of water 106 and into the subterranean formation 102 along ray path 120. A portion of the seismic waves reflects from the interface 114 between formations 102 and 104. The reflected waves travel upward through the formation 102 and back into the body of water 106 along ray path 122. The reflected waves travel past a receiver 110, which detects the waves and generates a representative signal.

Surface multiples are those waves that have been reflected multiple times between the water surface 116 and any upward reflectors such as the water bottom or formation interfaces, before being sensed by a receiver 110. An example of a surface multiple is shown by ray paths 130, 132, and 136.

Water layer multiples are those waves that have reflected multiple times between the water surface 116 and the water bottom 112 before being sensed by a receiver 110. An example of a water layer multiple is shown starting at ray path 130. Seismic waves are generated by a seismic source 108 and a portion of the waves travels downward through the body of water 106 along ray path 130. A portion of the seismic waves reflects from the water bottom 112 and travels back upward through the body of water 106 along ray path 132. A portion of the reflected waves reflects from the water surface 116 and travels back downward through the body of water 106 along ray path 134. A portion of the twice-reflected waves reflects again from the water bottom 112 and travels back upward through the body of water 106 along ray path 136. A portion of the thrice-reflected waves reflects again from the water surface 116 and travels back downward through the body of water 106 along ray path 138. A portion of the four times reflected waves reflects again from the water bottom 112 and travels back upward through the body of water 106 along ray path 140. A portion of the five times reflected waves reflects again from the water surface 116 and travels back downward through the body of water 106 along ray path 142. A portion of the six times reflected waves reflects again from the water bottom 112 and travels back upward through the body of water 106 along ray path 144. The seven times reflected waves then travel past a receiver 110, which detects the waves and generates a representative signal. The water layer multiple starting at ray path 130 is an example of a simple water layer multiple since the seismic waves would not go below the water bottom 112, i.e., the waves remain within the water layer or body of water 106. The water layer multiple starting at ray path 130 is a multiple of order three, since the multiple contains three reflections from the water surface 116.

A water layer multiple that goes below the water bottom 112 can be referred to as a peg-leg water layer multiple. FIG. 1 illustrates an example of a peg-leg water layer multiple starting at ray path 150. Seismic waves are generated by a seismic source 108 and a portion of the waves travels downward through the body of water 106 and into the subterranean formation 102 along ray path 150. A portion of the seismic waves reflects from the water bottom 112 and travels back upward through the body of water 106 along ray path 152. A portion of the reflected waves reflects from the water surface 116 and travels back downward through the body of water 106 and into the subterranean formation 102 along ray path 154. A portion of the twice-reflected waves reflects from the interface 114 and travels back upward through the formation 102 and the body of water 106 along ray path 156. A portion of the thrice-reflected waves reflects again from the water surface 116 and travels back downward through the body of water 106 along ray path 158. A portion of the four times reflected waves reflects again from the water bottom 112 and travels back upward through the body of water 106 along ray path 160. A portion of the five times reflected waves reflects again from the water surface 116 and travels back downward through the body of water 106 along ray path 162. A portion of the six times reflected waves reflects again from the water bottom 112 and travels back upward through the body of water 106 along ray path 164. The seven times reflected waves then travel past a receiver 110, which detects the waves and generates a representative signal. The peg-leg water layer multiple starting at ray path 150 is a multiple of order three, since the multiple contains three reflections from the water surface 116.

Multiples can be predicted, and the predicted multiples can be used to process recorded seismic data (such as by use of adaptive-match filtering and subtraction) to reduce the effect of multiples on processing and interpretation of recorded seismic data. In some examples, a desirable characteristic of a process that provides predicted multiples is that there is internal relative amplitude consistency of plural modes (e.g., a response mode that has a receiver-side round-trip of multiples, and a response mode that has a source-side round-trip of multiples) in the predicted multiples and the recorded seismic data. The internal relative amplitude consistency or inconsistency can reduce the likelihood of adaptive-match filtering and subtraction resulting in either or both over- and under-subtraction of different modes.

One embodiment of the Generalized 3D surface multiple prediction disclosed in U.S. Pat. No. 7,796,467 to Bisley et al., which is hereby incorporated by reference in its entirety, includes (a) selecting a target trace; (b) selecting a potential downward reflection point for the selected target trace; (c) computing at least one of a desired shot-side midpoint, offset and azimuth, and at least one of a desired receiver-side midpoint, offset and azimuth using the selected potential downward reflection point and the selected target trace. The desired shot-side midpoint, offset and azimuth define a desired shot-side trace. The desired receiver-side midpoint, offset and azimuth define a desired receiver-side trace. The method further includes (d) determining a pair of recorded traces substantially closest to the desired shot-side trace and to the desired receiver-side trace; and (e) convolving the pair of recorded traces to generate a convolution.

Wavefield extrapolation of recorded survey data through a model of the water layer can be used for creating water-layer-multiple model traces. A trace can refer to survey data acquired or predicted for a target structure in response to energy from one or more survey sources. A water-layer-multiple model trace can refer to a trace including predicted multiples that uses a model of a water layer. In accordance with some implementations, a general DWD technique disclosed in U.S. Patent Application Publication No. 20150006085 filed on Jun. 4, 2014, contents of which is hereby incorporated by reference in its entirety, employs a multidimensional (e.g., 2D, 3D, 4D, etc.) model of the water layer, subsurface, or other structure(s) through which multiples can propagate. With the general DWD technique, source and receiver side wavefield extrapolations cannot be performed in the same domain (unlike the 1D DWD techniques described above), because the wavefield extrapolation operators may differ between the source and receiver sides. In some examples, receiver-side extrapolation can be done on 3D (areal) shot gathers (a shot gather can refer to survey data collected by survey receivers for a particular shot), and source-side extrapolation can be done on 3D (areal) receiver gathers (a receiver gather can refer to survey data collected by a particular receiver in response to shots).

An actual recording geometry may not result in well sampled 3D gathers (particularly receiver gathers). As a result, the actual recording geometry is constructed from the available survey data (e.g., recorded seismic data).

One common theme in the typical GSMP and GDWD approaches to multiples prediction is the idea that discretization parameters for example, the extent of the aperture and the spacing of grid nodes within the aperture are typically user-selected prior to any multiple prediction or processing based on tests conducted on a limited amount of seismic data from the relevant survey. The selected aperture discretization parameters are then used to analyze or process large volumes of a survey. Those of ordinary skill in the art will appreciate that seismic data processing is compute power and time intensive. These costs constrain seismic processing jobs to adopt a user-defined parameter, for example, aperture extent, and use that parameter for an entire processing job. It is usually when the processing job is nearing completion that it may become apparent that the chosen parameter may be inadequate or inaccurate. For example, the selected aperture may be too small and more complex multiples may not be accounted for. Typically, it is then too late or costly to adjust the parameters and restart the processing job. Therefore, a need exists for a more efficient way of identifying accurate processing parameters before it is too costly to adjust processing parameters for a given processing job.

Figure 2:
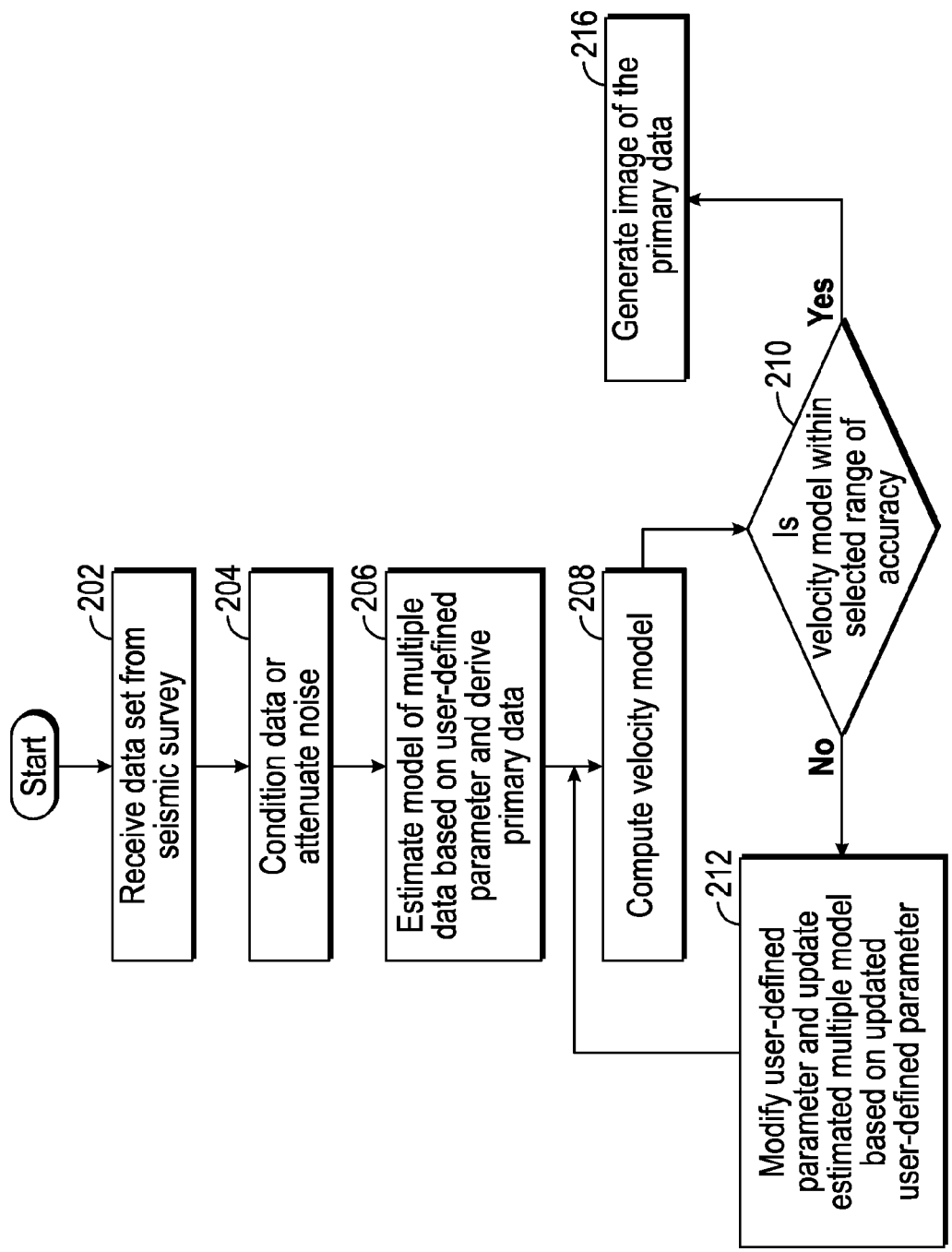
FIG. 2 illustrates a flow diagram of a seismic data processing technique, according to some implementations.

FIG. 2 illustrates one embodiment of the seismic data processing technique of present disclosure. Operation of the technique begins at a block 202 where the processing technique receives a seismic data set representing a subsurface region of interest. The data set may have been acquired from a seismic survey as discussed with respect to FIG. 1 above. As would be understood to those of ordinary skill in the art, the seismic data set may include data that is representative of primary data as well as multiple data.

The processing technique may condition the data set at a block 204. In this context conditioning the data set includes any processing operation that is undertaken to refine the data set prior to further processing. For example, one such processing operation includes noise attenuation to remove unwanted signals that are identifiable in the data set. One of several noise attenuation methods known to those of ordinary skill in the art may be employed. One non-limiting example of such noise attenuation methods is a linear noise attenuation (LNA) technique.

Figure 3:
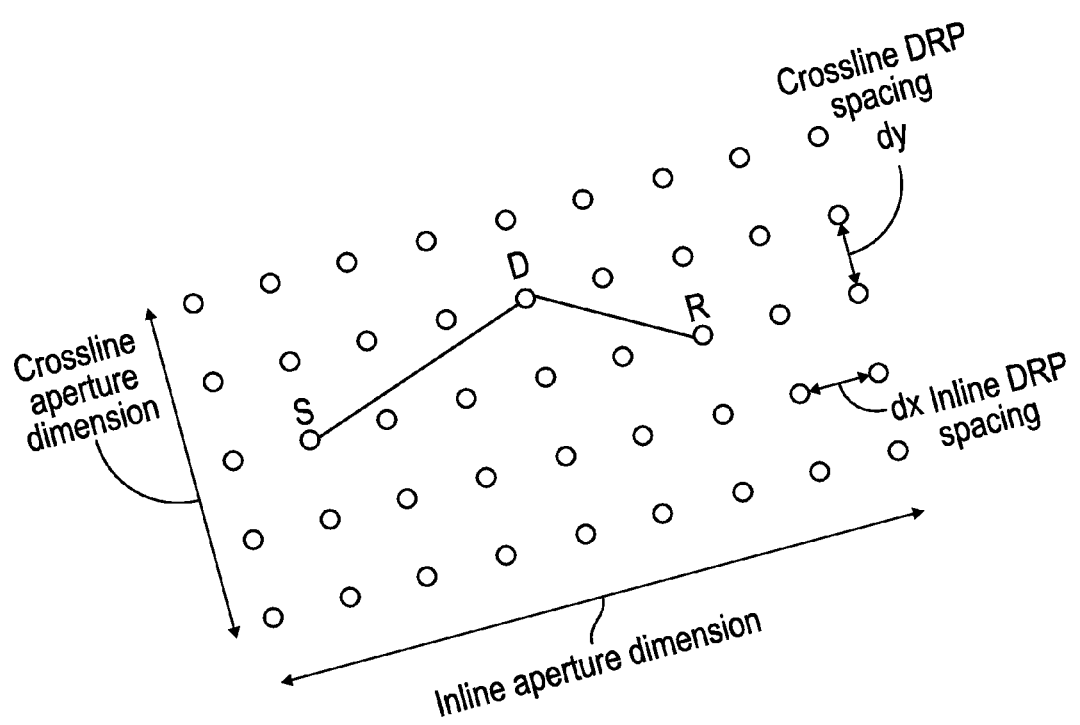
FIG. 3 illustrates a plan view of a seismic data acquisition geometry according to one embodiment of the present disclosure.

Next, the processing technique estimates a model of the multiples present in the conditioned or noise attenuated data set based on a user-defined parameter at a block 206. Some examples of user-defined parameters that may be selected include the aperture extent and/or spacing of grid nodes within the aperture. FIG. 3 illustrates the spatial aperture and its discretization for numerical computations in particular of free-surface multiples. shows an example of a selected aperture including potential downward reflection points of surface multiples as needed for computing the free-surface multiples with source location S and receiver location R. Typically, S and R coincide with the shot and receiver locations of a trace recorded in the survey, but in general S and R can be any locations. The aperture is the area selected for the computation of a certain integral providing the estimate of free-surface multiples for shot at S and receiver at R. Typically the aperture is a polygon that may be in one embodiment by location of corner points) or often and as a special case, a rectangle defined by its center (i.e., a midpoint of a source-receiver segment and the dimensions of its sides. A grid of nodes (downward reflection points, or DRPs) is defined within the aperture. The axis X and Y of the grid are orthogonal to each other, with X parallel to the source-receiver segment or to a survey grid axis when source and receiver location S, R are coincident. As an example, FIG. 3 shows a uniform, cartesian grid of downward reflection points. To compute an estimate of multiples by integral multi-dimensional convolution methods, an integral of the form:

$$T_m(X_s, Y_s, X_d, Y_d) = \iint_{Aperture} T_s(X_s, Y_s, X_{drp}, Y_{drp}) * T_d(X_d, Y_d, X_{drp}, Y_{drp}) dx dy$$

Where $T_m$=trace for which to predict multiple,
$T_d$=trace on detector side
$T_s$=trace on source side
dx=sampling interval over x
dy=sampling interval over y
$X_s$=Trace X coordinate at source
$Y_s$=Trace Y coordinate at source $X_d$=Trace X coordinate at detector
$Y_d$=Trace Y coordinate at detector
$X_{drp}$=X coordinate of the downward reflecting point
$Y_{drp}$=Y coordinate of the downward reflecting point Equation (1) can then be evaluated as a Riemann sum. Similar to the approach disclosed in U.S. Pat. No. 7,796,467 contributions of additional grid points in the aperture may be accounted for.

With continuing reference to FIG. 2, the processing technique of the present disclosure estimates a model the multiple data in the conditioned seismic data set based at least in part on a user-defined parameter at a block 206. The estimated model of the multiple data may be subtracted from the seismic data set to derive a primary data set. Next, a velocity model may be computed at a block 208 from the primary data set using the user-defined parameter. Then the technique allows for a user to determine whether the computed velocity model is within a predetermined range of accuracy at a block 210. This procedure and decision will typically require the computation of images (migration results) with the velocity model being evaluated. If the computed velocity model is not within the predetermined range of accuracy, the technique proceeds to a block 212 where the user modifies the user-defined parameter and the technique updates the estimated multiple model based on at least the user-defined parameter. Control then returns to the block 208.

In the event that a user determines at block 210 that the computed velocity model is within a selected range of accuracy, then control passes to a block 214 that updates the multiple data model based in part on the updated user-defined parameter. Next, a block 216 recomputes the primary data, the velocity, and generates an image of the recomputed primary data. Methods by which the primary data may be derived at any of the steps in the above-described technique are known to those of ordinary skill in the art and include, but are not limited to, an adaptive subtraction that uses adaptive match filtering, such as constrained adaptive match filtering (such as constrained adaptive match filtering described in U.S. Pat. No. 6,832,161). It is also contemplated that the technique 200 disclosed herein may be implemented where either the detector or source side terms (or both) i.e., $T_s$ or $T_d$ may be replaced with data computed from a subsurface geological model through simulation of seismic waves propagating in that model instead of actual data.

Figure 4:
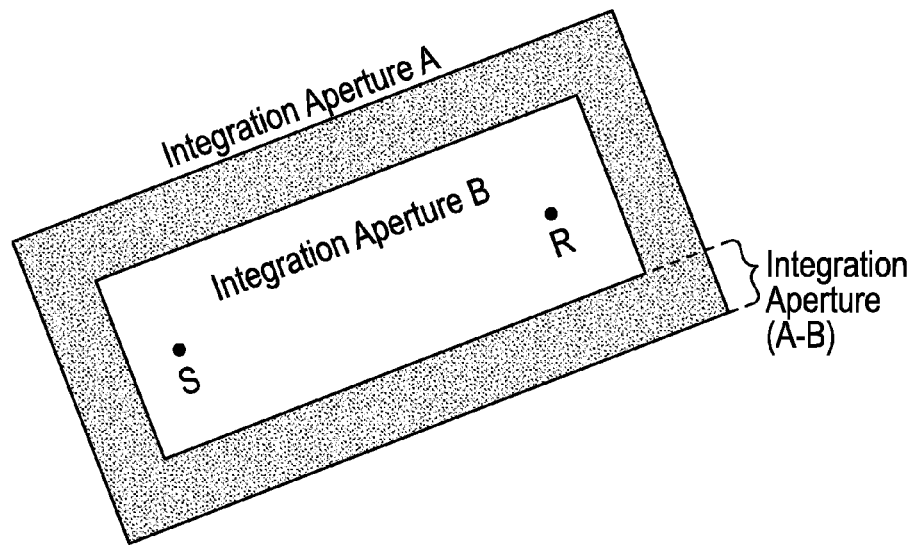
FIGS. 4 and 5 illustrate processing apertures according to one or more embodiments of the present disclosure.
Figure 5:
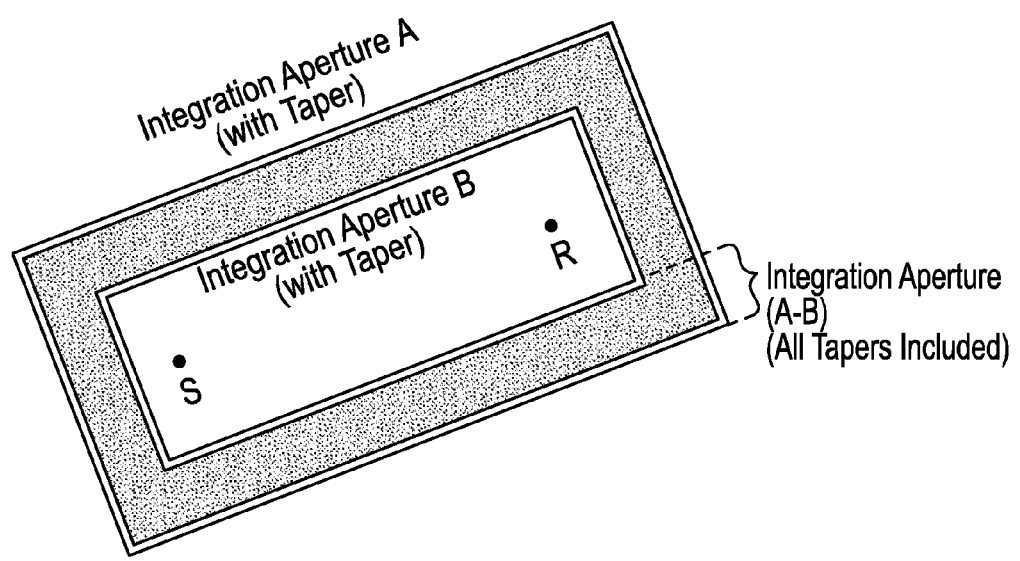

Referring now to FIG. 4, equation 1 above may be used to derive the multiple data in aperture B that is bounded by integration aperture defined by M×N. A user may later determine that the area of interest is actually defined by integration aperture A. Considering that the integration aperture B lies wholly within aperture A, the user need only define non-intersecting areas B and (A−B). It follows then that A=B+(A−B). Therefore, the area A may be characterized by computing the integral of equation 1 for areas B and (A−B) separately and in the process, refining the integration aperture for the smaller areas before deriving the integral of area A. As such, a first user defined parameter may be used to process the seismic data for integration aperture B. Then, the user-defined parameter may be adjusted or refined for more accurate processing of integration aperture A, thereby improving the results derived from the processing operations. Both apertures B and A may be variable as a function of shot and receiver coordinates, or other related attributes such as midpoint, offset, azimuth etc. FIG. 5 illustrates another example of an application of the technique of the present disclosure. As discussed above with respect to FIG. 4, multiples for the area 402 defined between area A and area B may be computed by first computing the multiples for area A and then computing the multiples for area B. The multiples for area 402 can then be defined by subtracting A-B. However, a taper 404 is applied around the edges of the areas A and B. This taper 404 may be compensated for by applying an appropriate scaling when solving equation 1.

Figure 6:
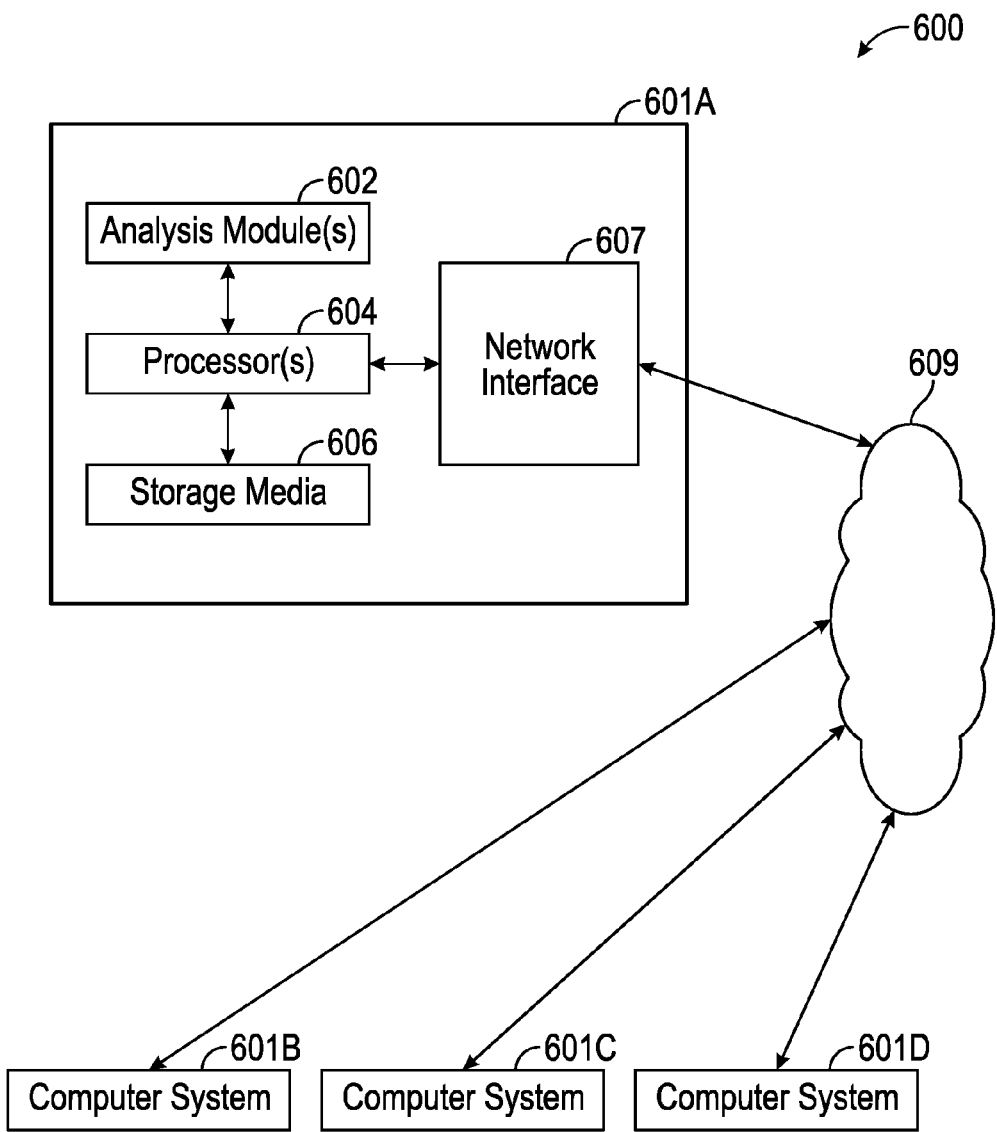
FIG. 6 is a block diagram of an example computing system in accordance with some implementations.

In some embodiments, any of the methods described herein may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis module(s) 602 configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor can include a microprocessor, microcontroller, processor module or subsystem, programmable integrated circuit, programmable gate array, or another control or computing device.

The storage media 606 can be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 600 is only one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the disclosure. In the foregoing description, numerous details are set forth to provide an understanding of the subject disclosed herein. However, implementations may be practiced without at least some of these details. Other implementations may include modifications and variations from the details discussed above. It is intended that the appended claims cover such modifications and variations.

What is claimed is:

1. A method, comprising:
   receiving a seismic dataset from a survey, wherein the seismic dataset represents a portion of a subsurface geological formation and includes primary and multiple data;
   conditioning the seismic dataset;
   estimating a model of the multiple data in the conditioned seismic dataset based on a first spatial aperture to derive a primary dataset;
   computing a velocity model from the primary dataset using the first spatial aperture;
   presenting the velocity model to a user;
   receiving from the user an indication that the velocity model is not within a predetermined range of accuracy and a second spatial aperture different than the first spatial aperture, the first and second apertures having an overlapping portion and a nonoverlapping portion;
   identifying a region that includes an area in which the first spatial aperture and the second spatial aperture do not intersect;
   estimating a second model of the multiple data in the conditioned seismic dataset based on the region;
   updating the estimated model of the multiple data to include the second estimated model;
   recomputing the primary dataset and the velocity model based on the updated estimated model; and
   generating an image of the recomputed primary dataset.

2. The method of claim 1, wherein a plurality of grid nodes within the first spatial aperture represents possible locations for multiple downward reflection points.

3. The method of claim 1, wherein the second spatial aperture is smaller than the first spatial aperture.

4. The method of claim 1, wherein the second spatial aperture is larger than the first spatial aperture.

5. The method of claim 1, wherein the first spatial aperture is a polygon.

6. The method of claim 1, wherein the estimating step includes a step of determining source and receiver pairs that correspond to each seismic trace in the seismic dataset.

7. The method of claim 6, wherein the estimating step includes convolving source receiver pairs to identify multiples.

8. The method of claim 1, wherein the multiple data is subtracted from the conditioned seismic dataset before generating the image of the recomputed primary dataset.

9. The method of claim 1, further comprising generating an initial image before updating the estimated model of the multiple data.

10. A system, comprising:
    a processor;
    memory operatively coupled to the processor; and
    processor-executable instructions stored in the memory to instruct the system wherein the instructions comprise instructions to:
       receive a seismic dataset from a survey, wherein the seismic dataset represents a portion of a subsurface geological formation and includes primary and multiple data;
       condition the seismic dataset;
       estimate a model of the multiple data in the conditioned seismic dataset based on a first spatial aperture to derive a primary dataset;
       compute a velocity model from the primary dataset using the first spatial aperture;
       present the velocity model to a user;
       receive from the user an indication that the velocity model is not within a predetermined range of accuracy and a second spatial aperture different than the first spatial aperture, the first and second apertures having an overlapping portion and a nonoverlapping portion;
       identify a region that includes an area in which the first spatial aperture and the second spatial aperture do not intersect;
       estimate a second model of the multiple data in the conditioned seismic dataset based on the region;
       update the estimated model of the multiple data to include the second estimated model;
       recompute the primary dataset and the velocity model based on the updated estimated model; and
       generate an image of the recomputed primary dataset.

11. The system of claim 10, wherein a plurality of grid nodes within the first spatial aperture represents possible locations for multiple downward reflection points.

12. The system of claim 10, wherein the second spatial aperture is smaller than the first spatial aperture.

13. The system of claim 10, wherein the second spatial aperture is larger than the first spatial aperture.

14. The system of claim 10, wherein the estimating step includes a step of determining source and receiver pairs that correspond to each seismic trace in the seismic dataset.

15. A non-transitory computer-readable storage media, comprising computer executable instructions to instruct a computer wherein the instructions comprise instructions to:
    receive a seismic dataset representing a portion of a subsurface geological formation wherein the dataset includes primary and multiple data;
    attenuate noise in the seismic dataset;
    estimate a model of the multiple data in the attenuated seismic dataset based on a first spatial aperture to derive a primary dataset;
    compute a velocity model from the primary dataset using the first spatial aperture;

present the velocity model to a user;
receive from the user an indication that the velocity model is not within a predetermined range of accuracy and a second spatial aperture different than the first spatial aperture, the first and second apertures having an overlapping portion and a nonoverlapping portion;
identify a region that includes an area in which the first spatial aperture and the second spatial aperture do not intersect;
estimate a second model of the multiple data in the conditioned seismic dataset based on the region;
update the estimated model of the multiple data based at least on the to include the second estimated model;
recompute the primary dataset and the velocity model based on the updated estimated model; and
generate an image of the recomputed primary dataset.

16. The non-transitory computer-readable storage media of claim 15, wherein the second spatial aperture is smaller than the first spatial aperture.

17. The non-transitory computer-readable storage media of claim 15, wherein the estimating step includes a step of determining source and receiver pairs that correspond to each seismic trace in the seismic dataset.

18. The method of claim 1, further comprising applying a taper at an edge of the region.

19. The method of claim 18, wherein the applying the taper includes applying scaling in the recomputing the primary dataset.

* * * * *